Fig. 1

George Berkley Cramp
INVENTOR.

March 19, 1957  G. B. CRAMP  2,785,879
WET GAS WASHING APPARATUS
Filed May 4, 1954  6 Sheets-Sheet 2

George Berkley Cramp
INVENTOR.

March 19, 1957 G. B. CRAMP 2,785,879
WET GAS WASHING APPARATUS
Filed May 4, 1954 6 Sheets-Sheet 3

George Berkley Cramp
INVENTOR.

BY *Clarence A. O'Brien*
*and Harvey B. Jacobson*
Attorneys

March 19, 1957

G. B. CRAMP 2,785,879

WET GAS WASHING APPARATUS

Filed May 4, 1954

George Berkley Cramp
INVENTOR.

2,785,879

WET GAS WASHING APPARATUS

George Berkley Cramp, Pasadena, Calif.

Application May 4, 1954, Serial No. 427,535

4 Claims. (Cl. 261—8)

The present invention relates to apparatus for cleaning stack gases and the like, and more particularly relates to a wet gas washing system for the washing or scrubbing with liquid, gases of combustion or of any other source to free them from physical impurities and particles, moisture, fumes or odor that would otherwise be carried into the atmosphere with the gases, thereby polluting the atmosphere.

There are many sources of atmospheric pollutions, such as the gases from coke ovens, blast furnaces, open hearth furnaces, Bessemer converters, sintering plants, steam power plants, municipal incinerators, electric furnaces, foundry cupolas, cement and lime kilns, various smelting operations and from many other sources. It is the general object of this invention to provide a wet gas washing system which will clean such gases prior to their entrance into the atmosphere to avoid pollution of the atmosphere.

Wet washing of various gases has long been practiced more or less satisfactorily, and it is known to be an effective means of freeing gases from dust and other impurities; however, certain practices and conditions have prevented a more general adoption of wet gas washing by industries. One of these practices is that of bringing the entire volume of hot, dirty gases to be washed and having temperatures which range approximately from 500° to 1000° F. into direct contact with the washing and cooling liquid, which liquid must be in sufficient quantity to absorb the heat of the entire volume of hot, dirty gases and reduce the temperature to approximately 220° F., or the condensation point of whatever moisture may be present in the incoming gases.

This practice requires the use of several times as much cooling and washing liquid as would be necessary if the heat of the hot gases could be absorbed and the temperature reduced to around the neighborhood of 300° F. just before they enter the presence of the washing liquid in the gas washer or scrubber.

A further objectionable practice is to carry this large volume of liquid, used but once through the washers, to either a public water course or to a central cooling tower, spray pond, and settling basin for cooling the water and settling out the solid particles to condition the water for recirculation through the gas washers. By this exposure of large quantities of water to direct atmospheric cooling, much water is lost by evaporation and a large capacity dredging or pumping equipment or crane operated grab bucket must be employed to recover the solids deposited in such centrally located gas washing liquid treating plants. Further, the first costs of providing such plants are necessarily high, especially when only an initial minimum capacity is required, but a large future capacity must be provided for, the space for which is often not available at long established and congested plant sites. Likewise, a plentiful supply of water for use at such plants as the washing and cooling liquid requires often does not exist.

Accordingly, among the most important objects of this invention is the provision of a wet gas washing system which is exceedingly compact and which is capable of installation at the individual furnace stack, which requires no reserve area for future installations or for supplemental, larger capacity equipment, and the cost of which may be related to each individual stack or furnace installation.

An important object of the invention is the provision of a wet gas washing system which is entirely automatic in its operation in directing the flow of hot furnace or other gases either directly to the individual furnace stack or to the wet gas washing system so that no interference with normal furnace operations will occur if any one or all of the units of the gas washing system fail to function and whereby the furnace operators will never be inconvenienced by sudden shut-off of the furnace draft and resultant backing up of furnace stack gases.

An exceedingly important object of the present invention is to provide a wet gas washing system which provides for an immediate exchange of heat of the hot, dirty stack gases as they enter the gas washing system with the returning stream of cooled, cleaned gases from the gas washer unit of the system so that a minimum of heat remains in the uncleaned gas stream entering the gas washer unit, thereby lessening the heat load of absorption of the wash liquid in the gas washer unit and thus accomplishing cooling and washing of the entering gases with the use and circulation of the minimum amount of washing liquid entailing, in turn, the minimum amount of cooling air to be cycled through the liquid cooling system for cooling the liquid for recirculation in the washer unit, and providing a means for cooling the washing liquid without bringing this liquid into direct contact with the atmosphere.

Another important object of the invention, ancillary to the preceding object, is the provision of a wet gas washing system wherein the cooled, clean gases after leaving the washing unit of the system are run through thin-walled heat exchange radiators on the outside of which radiators flow the hot, dirty gases to the gas washer, whereby the temperature of the hot, dirty gases is greatly reduced, necessitating less cooling water to absorb the heat and providing a means whereby the cooled, cleaned gases are heated up to a temperature considerably above that of saturation before flowing into the stack, whereby the stack will be retained warm and ready at all times to pick up the full stream of hot, dirty gases if this should become necessary upon failure of the gas washing system to function.

It is a further object of the invention to provide a wet gas washing system having circulating fans, or blowers, which are automatically regulated by dampers at their inlet ends so that a positive pull, suction, or minus pressure is maintained on the stream of hot, dirty gases from the furnaces, simulating that which the stack would produce when on natural draft, throughout the gas washing system.

A further object of the invention is the provision of a wet gas washer unit wherein the washing liquid, usually water, permits the slow settling or dropping of the solids washed from the gases through the washing liquid and which provides for the removal of these solids from the washer unit as they settle and which will retain the washing water in an adequately cool state for the purpose of absorbing the heat of the incoming dirty gases to assure proper condensation of the moisture ordinarily carried in these gases.

A still further object of the invention is in the provision of a wet gas washing unit having a gas washing device which provides a maximum washing surface area in contact with the gases at all times which surface area serves to divide or slice the volume of gases to be cooled into as thin layers as possible and practical and which will bring these thin layers into intimate contact with the washing surfaces, and whereby the washing or baffled surfaces on which the dust and other impurities are deposited by the gases during the washing operation are continuously and copiously flushed with the washing medium while utilizing a minimum of the washing medium and a minimum of power for circulation.

A final object of the invention to be mentioned specifically is the provision of a wet gas washing system wherein each unit or piece of apparatus of the system may be shop fabricated and assembled and capable of assembly simply by bolting or other conventional means, and being capable of shipment by truck, freight car or other common carriers without special modifications or adjustments.

A highly practical and advantageous feature of the invention resides in the provision of a wet gas washing system wherein the capacity of the system may be increased simply by stacking units or pieces of apparatus constituting the system in stacked relation on top of the initial unit installations without the necessity for occupying additional ground space other than that already allotted to the initial installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now most particularly to Figures 1-4 of the drawings, a typical installation is shown to which the wet gas system of the present invention is applied. As will be understood, only a sufficient amount of this installation is disclosed as to enable one skilled in the art to understand the application of the gas washing system of the present invention thereto. From a furnace (not shown), an underground flue 10 leads directly to a stack 12 through which the hot, dirty flue gases ordinarily escape into the atmosphere. In accordance with the present invention, an inlet by-pass flue 14 opens into the main flue 10 and a double acting damper 16 ordinarily blocks passage though the main flue 10 and directs the hot, dirty flue gases into the inlet flue 14.

From the inlet flue 14, the hot flue gases are directed upwardly through a heat exchanger 18 wherein these hot, dirty gases come into contact with large surface areas of thin walled radiator cores 20 through the inside of which flows a return stream of cool, clean gases from the gas washing system. The heat exchange relation is such that the hot, dirty gases are cooled to a temperature approximating 300° approaching the condensation temperature of the moisture held within the gases. At the same time, the cool, clean gases passing through the inside of the radiator cores 20 absorb the heat from the hot gases whereby the clean gases are heated to a temperature considerably above that of moisture saturation before flowing into the stack 12 maintaining the stack warm and ready at all times to pick up the hot, dirty gases directly from the main flue 10 if conditions necessitate.

After leaving the heat exchanger 18, the somewhat cooled, dirty flue gases pass into the inlet or overhead duct 22 leading to the fan or blower 24 driven by the motor 26.

Figure 1:
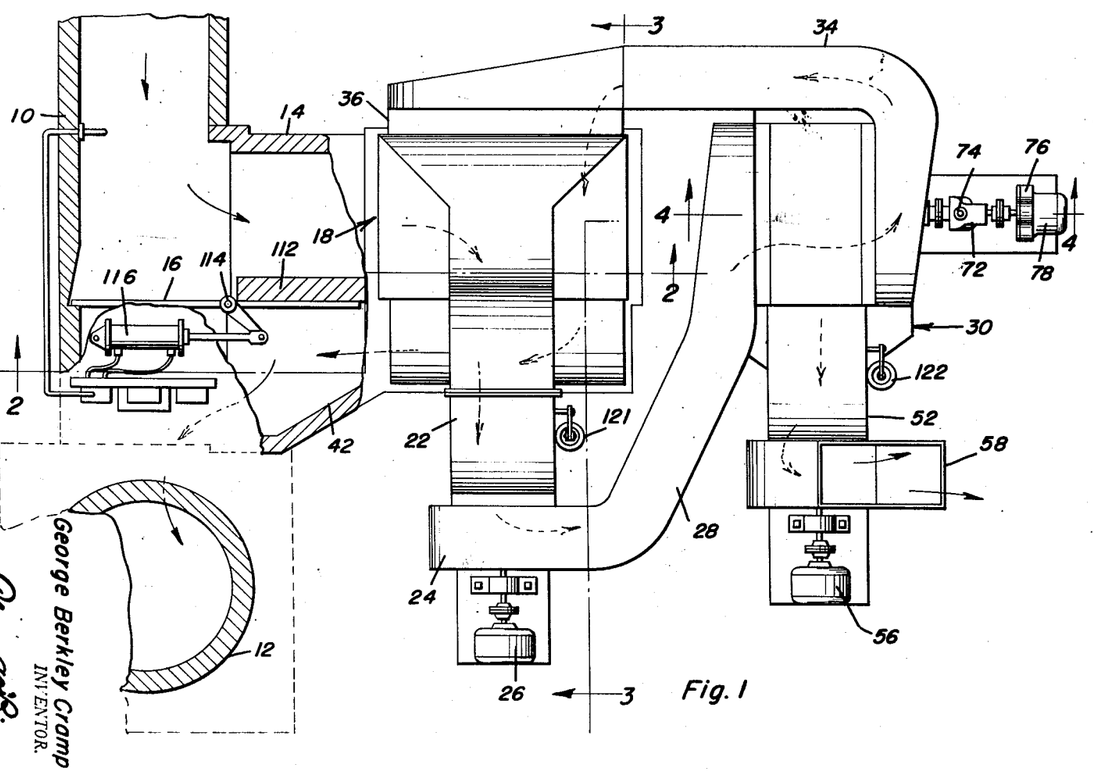
Figure 1 is a top plan view of the wet gas washing system apparatus applied to a typical furnace flue and stack construction with portions of the flue, stack and washing apparatus being broken away for clarity of detail.
Figure 2:
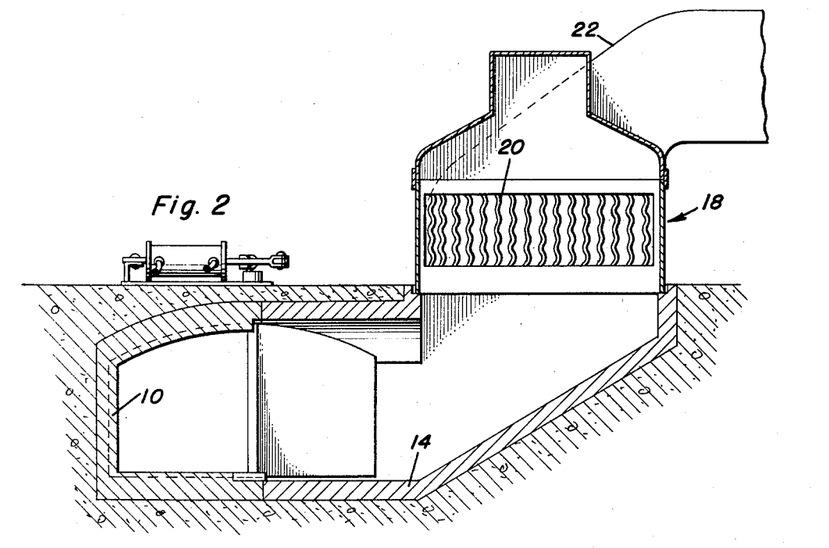
Figure 2 is a front elevational view of a portion of the gas washing apparatus taken substantially along the plane of section line 2—2 of Figure 1.
Figure 4:
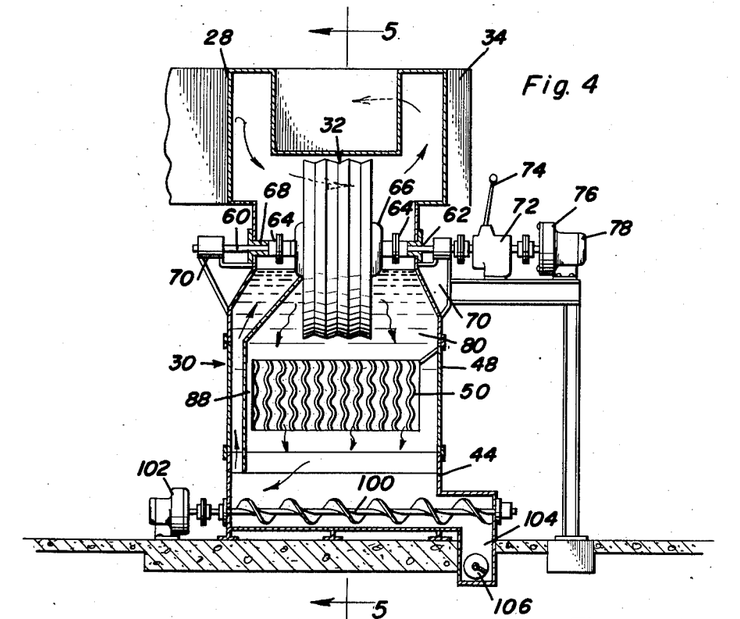
Figure 4 is a cross-sectional view of the gas washing unit of the apparatus taken substantially along the plane of section line 4—4 of Figure 1.

On leaving the blower 24, the dirty gases are conducted through duct 28 to the wet gas washing unit 30 (note Figures 1 and 4). In this connection, it might be noted in the set-up shown that the blower 24 will force the gases through the duct 28 into the gas washing unit 30 under positive pressure; however, in many instances, it may be desirable to have the gas washing unit 30 operate under minus pressure or suction which could be done simply by placing the blower 24 on the outlet end of the gas washing unit 30. Within the washing unit as shown in Figure 4 is a rotating water wheel 32 which serves to cool the grass to a temperature below the moisture condensation point and to wash or scrub the gases to clean them from physical and chemical impurities. A more specific description of this gas washing unit is given at a later point in this specification.

After being scrubbed and cooled by the water wheel 32, the cool, clean gases pass out of the gas washing unit 30 into the return duct 34 (note Figure 4 and Figure 1) which connects to the cool gas inlet 36 of the heat exchanger 18 where the cool clean gases perform the previously mentioned two-fold function of cooling the hot, dirty gases going into the gas washer while picking up the heat from these hot gases and carrying it up the stack 12.

The heated, clean gases pass through the clean gas outlet 38 of the heat exchanger 18 into the duct 40 through the outlet bypass flue 42 opening into the main flue 10 on the other side of the damper 16 and thence through the stack 12.

The apparatus is provided throughout the various units with suitable controls coupled with one another to form an automatic control system for the apparatus whereby the normal stack pull or draft is maintained on the gases throughout their passage through the gas washing apparatus while maintaining the wash water or liquid of the gas washing unit at a constant temperature or within a specified range of temperatures and which operates upon break-down of any or all of the units of the gas washing system to immediately divert the hot stack gases from the system back into the main flue 10, by-passing the gas washing system to avoid the build-up of back pressure in the main flue and furnaces which might otherwise occur.

These controls and the manner in which they function are discussed later herein, along with a detailed description of the various operating units of the gas washing system which follows.

*Gas washing unit*

Referring to Figures 4-8, the gas washing unit 30 and the components thereof may be most readily observed.

The washing unit 30 consists essentially of a shell or casing 44 having a trough-shaped bottom 46 with the water wheel 32 being mounted rotatably within the upper end portion thereof. Cooling water or liquid is, of course, carried within this casing 44, and intermediate the upper end portion and the bottom 46 of the casing, a heat exchanger 48 is provided. The heat exchanger is provided with a plurality of spaced, hollow radiator cores 50 which open into opposite sides of the washer casing 44. A blower duct 52 is attached to one side of the washer casing 44 so that one set of ends of the radiator cores 50 open therein. The other set of ends of the radiator cores open into the atmosphere on the opposite side of the washer casing 44.

Fan 54, driven by a suitable motor 56, communicates with the fan or blower duct 52 to draw air through the radiator cores 50 from the atmosphere through the heat exchanger 48 and duct 52, thence exhausting it back into the atmosphere through exhaust duct 58. The cooling and scrubbing water within washing unit 30 freely circulates between radiator cores 50 and the heat exchanger 48 to maintain this water cooled sufficiently to lower the temperature of the warm, dirty gases being scrubbed in the unit to a temperature below the moisture condensation point. By this indirect cooling of the wash water through the walls of the radiator cores 50, this water never comes in contact with the atmosphere wherein large amounts thereof would ordinarily be lost by evaporation.

Noting particularly Figure 4 and the right and left sides of the casing 44, as viewed in this figure, aligned shafts 60 and 62 project into the casing and are flanged at their spaced, adjacent inner ends within the casing, as at 64. To these flanges 64 are bolted mating flanges of the hub or core 66 of the washing wheel 32. Conventional packing glands 68 are provided in the walls of the casing 44 through which the shafts 60 and 62 extend. Outboard bearings 70 mounted on the casing support the outer ends of the shafts 60 and 62, which arrangement permits the removal of the water wheel 32 without disturbing the shafts or the shaft bearings. To the right end of the shaft 62 is coupled a gear shift transmission 72 having gear shift lever 74 by means of which the rate of rotation of the water wheel may be controlled. When it is desired to flush the wheel, the wheel may be rotated at high speed for a short period and, depending on the rate of flow of the gas through the water wheel, the gas density and other factors, it may be otherwise desirable to increase or decrease the rate of rotation of the water wheel. To the right end of the transmission 72 is coupled a gear reducer 76 driven by motor 78 which operates to drive the water wheel at variable speeds through the transmission.

From this arrangement of Figure 4, it will be seen that the water wheel driving shafts 60 and 62 are disposed above the surface of the washing water 80 within the casing 44. Further, the shafts 60 extend parallel to the passage between the inlet conduit 28 and the outlet conduit 34 for the gases so that the water wheel 32 rotates transversely of such passage assuring the warm, dirty gases entering through conduit 28 of a thorough washing or scrubbing before passing out through the return conduit 34.

Turning now to Figures 5-8, the particular construction of the water wheel 32 will be described. As mentioned above, the hub or core 66 of the water wheel is flange coupled to the shafts 60 and 62. The shape of this hub 66 is that of a cylinder. Longitudinally and radially spaced sets of arms or spokes 82 project from the core 66. The number of pairs of spokes 82 is not critical; however, as a practical matter, three or four equally spaced pairs should be sufficient. Mounted on these posts in radially spaced relation to one another are a plurality of circumferential, concentric thin gauge baffle sheets 84. They are so mounted on the post 82 that the faces of the sheets are parallel to the longitudinal axis of the hub 66. The sheets are spaced relatively close to one another and present their thin edges to the incoming gas stream from the duct 28, slicing this gas stream into thin layers to provide the greatest possible scrubbing or baffle area per cubic unit of gas passing through the gas washing unit 30. With this concentric circle construction, a tremendous gas scrubbing area per cubic unit of gas passing through the wheel is provided. The faces of the baffle sheets are preferably corrugated to create the maximum turbulence on the gas passing through the water wheel as well as to increase as much as possible the surface cleaning area of the water wheel. As will be noted, approximately one-half of the water wheel is at all times disposed beneath the surface of the washing water 80 whereby the baffle plates are continuously provided with a thin film of water serving to cool the gases as well as to collect the physical impurities previously held in suspension by the gases. Of course, as the wheel continues to rotate, the dust is removed from the wheel upon submerging of the wheel in the water 80. To assist this cleansing action, between each pair of baffle sheets 84 at the time of assembly of the water wheel, there are mounted on each pair of spokes 82 spacers or vanes 86 which are set at an angle to the longitudinal axis of the wheel hub 66 so that as the wheel is rotated, one end of each vane rises out of the pool of water 80 before the opposite end. This action forces a triangular-shaped body of water to flow rapidly from left to right between the baffle sheets 82 to effectively flush the dust particles that have been held on the baffles, off the baffle surfaces and out of the right hand end of the wheel 32 into the pool of water 80. At the same time, this action restores a fresh film of water to the faces of the baffle sheets while giving a current direction from left to right of the pool of water 80. This current flow may be noted particularly in Figure 4 by the directional arrows from the left or entrance end of the gas into the water wheel toward the right or exit end of the gas from the water wheel. This current movement thus continually drains impurities from the right side of the wheel while presenting the cleaner, cooler water to the left side of the wheel. To assist in always presenting the cooler clean water to the left side of the wheel, baffle plate 88 is provided between the heat exchanger 48 and the left end wall of the casing 44. This water circulation serves the obvious function of presenting the coolest water to the incoming gas stream, and as the amount of heat in the warm, dirty gases entering the washing unit 30 has been reduced by several hundred degrees in the heat exchanger 18, the amount of water necessary to be circulated in the washing unit and through the water wheel is kept at a minimum.

A float well 90 is provided at the right hand side of the casing 44 opening into the casing. Float operated valve 92 in the water supply pipe 94 is operated by the lowering of the liquid level in the washer unit 30 to admit make-up water into the unit. Upon lowering of the water level in the washer unit and float well below a predetermined level, the float 96 disposed in the well 90 drops correspondingly and opens the valve 92.

On the left side of the washer is a water seal overflow box 98 which collects an excess of water which may accumulate in the washer from an excess of moisture in the gas stream to prevent the level of the water within the gas washing unit 30 from being raised due to accumulation of condensate from the warm dirty gases.

Extending longitudinally of the trough-shaped bottom 46 is a screw conveyor 100 driven by motor 102 which rotates slowly to move the settled impurities into the sump 104 from which they pass through the outlet 106 to a sludge pump, or bucket elevator, not shown, and are thus removed from the system.

Figure 8:
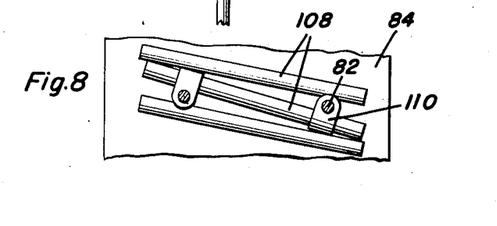
Figure 8 is an enlarged view of one of the baffled surfaces of the wheel utilizing a modified construction for the vanes of Figure 7.

In Figure 8 is shown a view of an optional baffle shape of the water wheel 32 wherein the vanes 86 mounted on the post are eliminated. In this modification, the faces of the baffle sheets are simply provided with tubes 108 suitably clipped thereon, as by means of clips 110. The tubes 108 are angled across the baffle faces in the same manner as were vanes 86 and discharge water to wash and coat the wheel 32 from left to right in the same manner as baffles 86.

The control system

In order to maintain the apparatus at normal stack conditions regarding volume and rate of flow of the gas stream therethrough, to divert the gas stream back into the main flue should any or all units of the system become inoperative, and to control the passage of gas streams through the apparatus into the stack, a suitable control system is provided.

Figure 9:
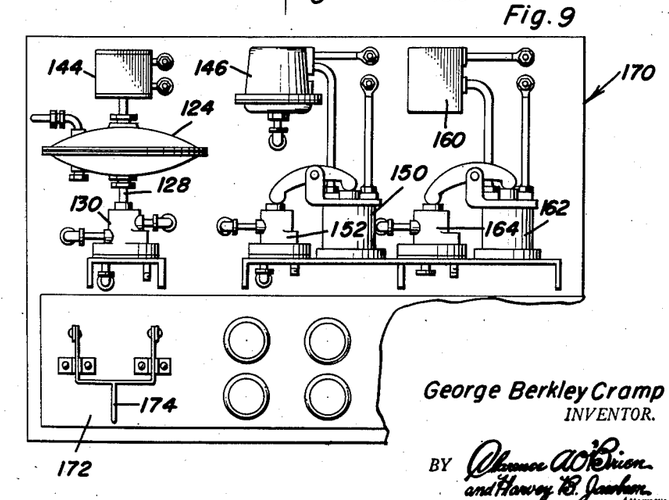
Figure 9 is a front elevational view of the control panel for operating the units of the gas washing system.
Figure 10:
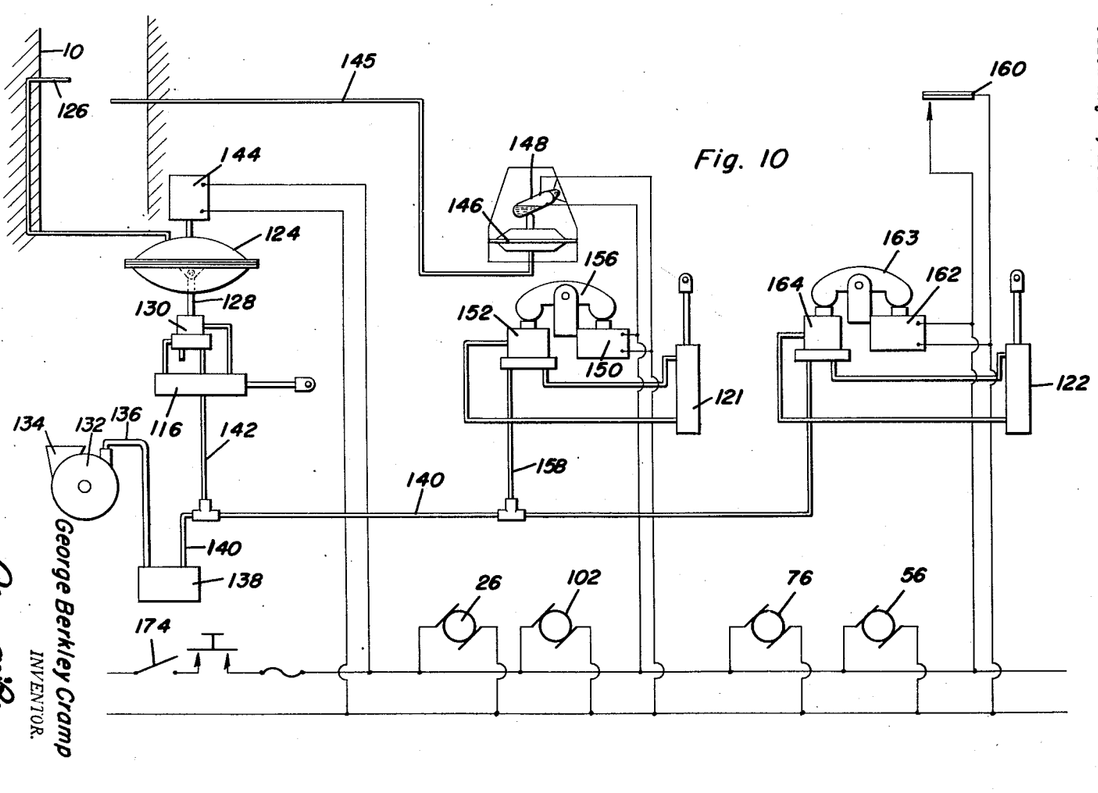
Figure 10 is an enlarged plan view of the operating system for the dampers, blowers and motors utilized in the gas washing system.

The primary operating parts of this control system may be observed with relation to the apparatus in Figures 1, 3, 4 and 5, while the over-all operation of this control system may be followed from Figures 9 and 10.

Noting first Figure 1, it will be seen that a partition wall 112 separates the gas inlet flue 14 from the gas return flue 42 and that the damper 16 is centered at the edge of this partition wall by the bearing 114 for swinging movement. Normally, the damper is in the position shown in Figure 1 with relation to the stack which normally blocks the main flue 10 to force the gas into the inlet flue 14 while swinging movement of the damper to a position parallel to the walls of the main flue 10 prevents passage of the gas into the gas washing apparatus and channels the gas directly into the stack 12. The damper 16 is operated from its opening and closing positions by the pneumatic or hydraulic cylinder and piston assembly 116.

Figure 3:
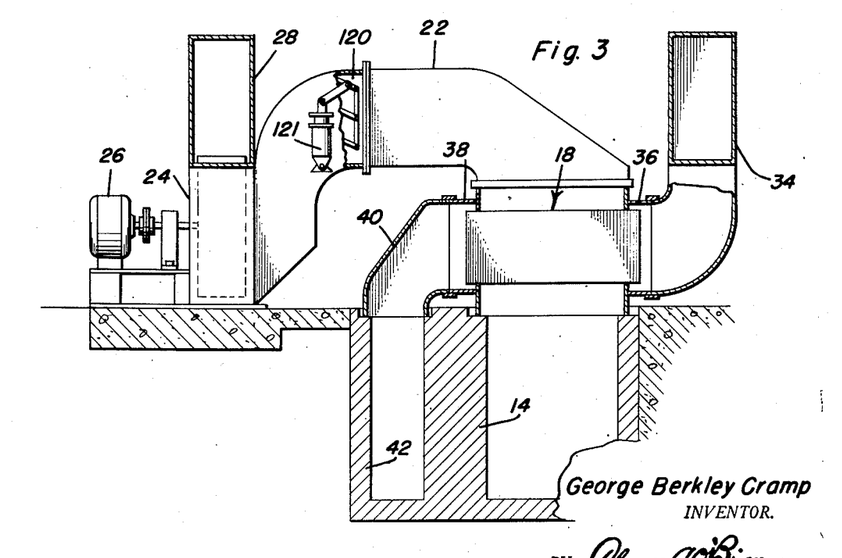
Figure 3 is a transverse cross-sectional view of the apparatus taken substantially along the plane of section line 3—3 of Figure 1.

In Figure 3, it will be noted that a damper 120 is provided in the duct 22 on the inlet side of the blower 24 operated by the cylinder and piston assembly 121. The purpose of this damper 120 is to maintain the draft within the gas washing apparatus comparable to those normally existing within the main flue 10.

Figure 5:
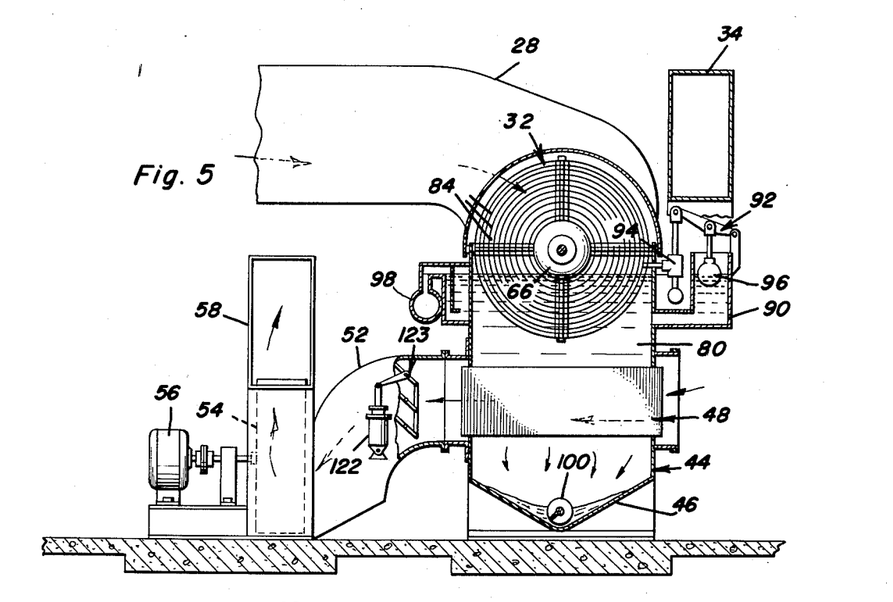
Figure 5 is a transverse cross-sectional view of the gas washing unit of the apparatus taken substantially along the plane of section line 5—5 of Figure 4.
Figure 6:
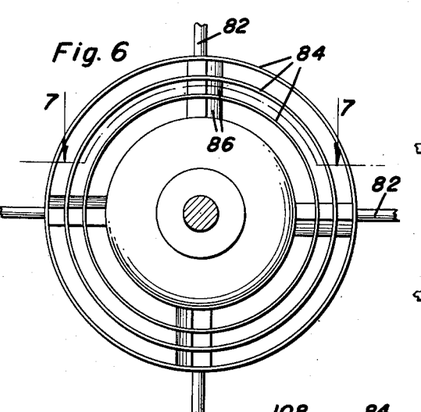
Figure 6 is an enlarged front elevational view of the gas washing wheel of the gas washer unit.
Figure 7:
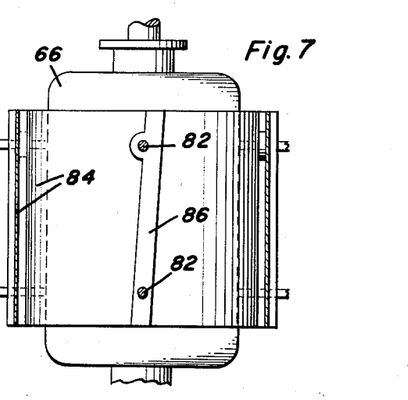
Figure 7 is a top view of the washing wheel of Figure 6, taken substantially along the plane of section line 7—7 of Figure 6 and disclosing the positioning of the vanes for washing the baffled surfaces of the wheel.

A further damper arrangement 123 is provided on the heat exchange conduit 52 of the washing unit 30 on the inlet side of the blower 54, as shown in Figure 5, to control the velocity of air passing through the heat exchanger 18 to thereby regulate temperature of the water within the washing unit as required by operating conditions. Motors 78, 102, 56 and 26 driving the water wheel, conveyors and blowers, respectively, are likewise tied into the operating control system for the apparatus.

To control the various units of the system, reference is made to Figure 10. The control for the primary damper 16 consists of a suitable diaphragm type automatic damper control 124. To actuate the same, a tube 126 leads from the main flue 10 to the top of the diaphragm and the suction within the flue raises the stem 128 which operates an air, or hydraulic, port valve 130 which admits air, or hydraulic fluid, to either end of the cylinder 116 which operates the primary damper 16. If the suction within the flue 10 should decrease to zero, or above, the diaphragm would drop its stem and open the port valve 130 leading to the piston rod end of the cylinder 116 which would close the damper with respect to the gas washing apparatus so that gas would pass directly through the main flue 10 into the stack 12.

An air supply for the hydraulic system is provided in the form of the rotary air compressor 132 having air inlet 134 pumping air through the line 136 to the compressor tank or receiving tank 138. From the air receiving tank, conduit 140 leads to the various damper ram assemblies, 116, 121 and 122. Branch conduit 142 leads to the port valve 130 supplying the cylinder 116.

The automatic operation of the damper 16 would occur if all electric power were to be cut off not only from the gas washing equipment motor drives, but from the control panel of the control system. As long as the electric power remains cut off, the damper would leave the main flue 10 open to the stack 12, but when the current was again turned on, the electromagnet 144 at the top of the diaphragm stem would be energized, raising the stem 128 and opening port valve 130 to the opposite end of cylinder 116 and returning the damper 16 to a position closing the main flue 10 and opening the inlet and return flues 14 and 42, respectively, to and from the gas washing system. Obviously, this operation could be accomplished manually from the control panel or by remote control from the furnace operating floor, if desired.

The damper 120 on the conduit 22 controlling the draft within the gas washing system is likewise controlled by the pressure within the main flue 10 and tube 145 leads from the main flue 10 to the diaphragm 146, the stem of which actuates the mercury switch 148 closing an electric circuit to the solenoid 150 which, in turn, operates the port valve 152 by means of the fulcrumed lever 156 admitting air under pressure to the opposite ends of the cylinder 121, being supplied by the branch conduit 158 from conduit 140.

A similar solenoid controlled port valve operates the cylinder 122 for the washing unit heat exchanger damper 123, the primary distinction of this solenoid operated unit over the one above described being that it is operated by a thermostatic control 160 rather than the mercury switch control 148. In this valve arrangement, closing of the circuit is accomplished by the bimetal of the thermostatic switch 160 which, in turn, operates the solenoid 162 moving the lever 163 thereby operating the port valve 164 and admitting air to either side of the hydraulic cylinder 122.

In this connection, it will be noted that all of the motors of the system for the blowers, conveyor and water wheel are connected in parallel and are operated independently of the operation of the switches 148 and 160.

In Figure 9, the arrangement of the operating elements of the control system on a control panel 170 is depicted.

The panel 172 on the control panel 170 includes a hand operated master switch 174 for the circuit and push-button controls for the various starting relays and cut-outs for starting and stopping of all of the electric motor drives of the wet gas washing system when the automatic controls close off the flue gases to the washing system.

Heat exchanger unit

In order to complete all the requisites for a gas washing system called for in the objects of this invention, a specific heat exchange unit construction is provided for permitting vertical expansion of the system without the necessitation for increased floor space, in a very economical and practical manner.

This heat exchange construction is shown clearly in Figures 11–14 and will now be described in detail.

Figures 11, 12, 13, 14:
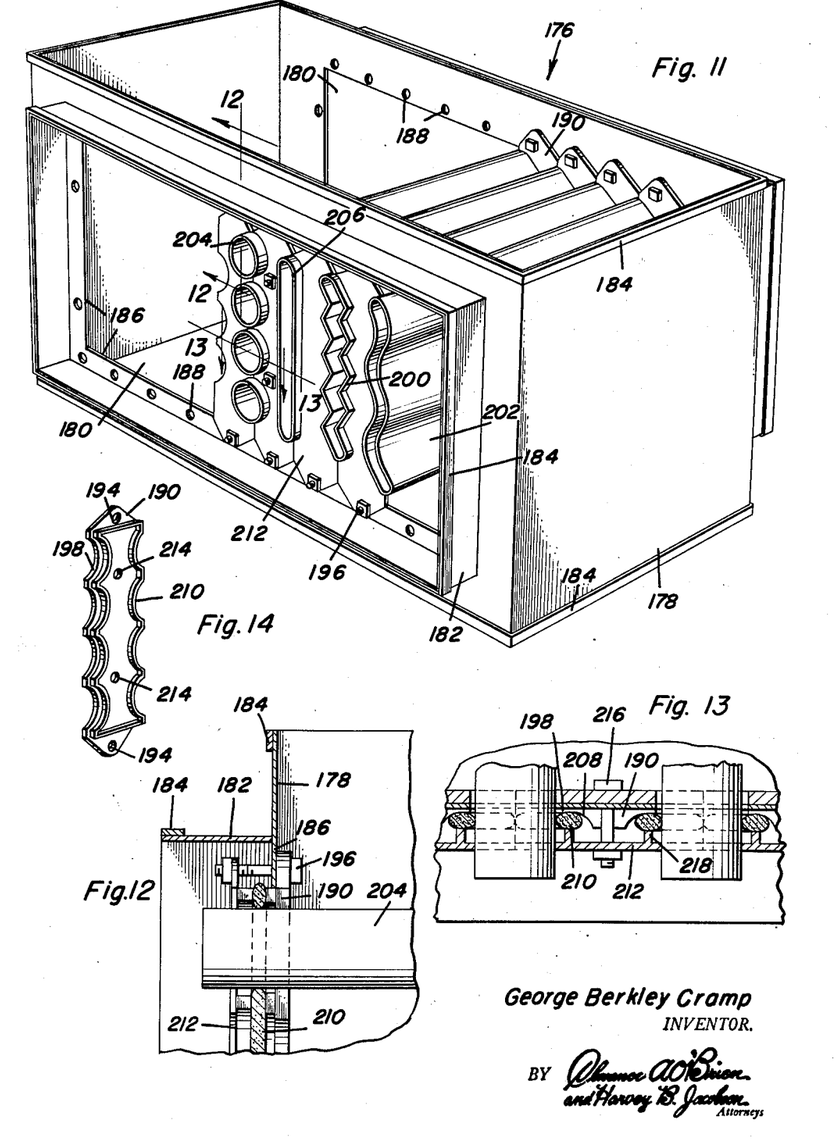
Figure 11 is a perspective view of a novel heat exchange baffle shell or casing that may be utilized in the heat exchange units of the present invention.
Figure 12 is a cross-sectional view of a portion of the frame taken substantially along the plane of section line 12—12 in Figure 11 disclosing the packing gland construction for the packing gland wells of the unit of Figure 11.
Figure 13 is a cross-sectional view taken substantially along the plane of section line 13—13 of Figure 11 disclosing on an enlarged scale, another portion of the packing glands and their relation to the packing gland wells.
Figure 14 is a perspective view of one of the packing gland wells which may form a portion of the universal core frame.

In Figure 11 is designated by the numeral 176 the heat exchanger shell, casing or core frame consisting essentially of a rectangular duct or tubular section 178 open at its upper and lower ends and having openings 180 in the opposite sides thereof surrounded by coupling necks 182. The free upper and lower edges of the core frame 178 and the free edges of the necks 182 are provided with simple coupling flanges 184 whereby the sections may be quickly and readily coupled to identical adjacent and vertically disposed sections or connecting ducts. As will be noted, the necks 182 spacedly surround the side wall edges defining the openings 180 in the side walls of the frame 178 to provide valances 186 for the side wall openings 180. The valances 186 are provided with openings 188 spaced therealong. The openings 188 in the upper and lower valances of each side wall opening 180 are in vertical alignment with one another, and packing gland wells 190 mounted within the frame or shell 178 vertically bridge the side wall openings 180 and have top and bottom apertures 194 registering with top and bottom apertures 188 in the upper and lower valances, whereby they may be secured to the valances by means of bolts 196. The packing gland wells 190, as shown particularly in Figure 14, are simply flat plates having their side edges contoured to partially embrace a conventional baffle shape, as at 198. By varying the shape of this side edge configuration, the wells 190 may be adapted to receive zig-zag radiators, such as that shown at 200, corrugated radiator cores, such as that shown at 202, cylindrical tube type radiator cores, such as that shown at 204, flat tube shapes, such as that shown at 206, and any other radiator core or baffle shape desired. The packing gland wells 190 have grooved side edges 208 communicating with top and bottom grooves bridging the space between the side edges for the reception of packing 210.

The wells 190, as can be noted from the drawings, are placed in side-by-side relation to one another in the core frame 176.

To spread the packing 210 into sealing relation with the cores mounted between the complementary configurated edges of adjacent packing gland wells, packing glands 212 are mounted on the opposite surfaces of valances 186 in registery with the packing gland wells 190. The bolts 196 extend through the upper and lower end portions of the packing glands 190 to mount these elements on the core frame and draw them toward the wells 190. Additional apertures 214 are provided intermediate the upper and lower ends of the gland wells 190 in registery with corresponding apertures in the glands 212. Bolts 216 extending through these last mentioned apertures draw the wells 190 and glands 212 toward one another intermediate their upper and lower ends.

Flanges 218 on glands 212 engage the packing 210 on gland wells 109 to spread the packing into sealing relation with the radiator cores.

This arrangement, in addition to providing a universally adaptable radiator core frame, permits ready removal and replacement of individual radiator cores in the event of damage thereto.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a flue for conducting hot gases from a furnace to a stack into which said flue opens, a gas washing system comprising an inlet by-pass flue connected with said flue, a damper mounted pivotally to direct an adjustable quantity of the hot gases into said inlet by-pass flue, a heat exchanger into which said by-pass flue opens and including a casing, a radiator core in said casing on the exterior surface of which the hot gases are adapted to impinge, a duct connected with said casing to lead off the gases after having passed over the surfaces of said core, a blower operatively connected with said duct to propel the gases therethrough, a wet gas washing unit arranged to be fed the gases from said blower and adapted to wash and cool the gases, a duct extending from said blower to said wet gas washing unit, a damper in the first mentioned duct upstream of said gas washing unit, means responsive to the suction in said flue to actuate the last-mentioned damper for maintaining the flow through said gas washing unit approximately the same velocity as that in said flue, a conduit leading from said gas washing unit to said core for conducting the cool gases thereto in order to extract heat from said core, and a clean gas conductor leading from said core to said stack.

2. In combination with a flue for conducting hot gases from a furnace to a stack into which said flue opens, a gas washing system comprising an inlet by-pass flue connected with said flue, a damper mounted pivotally to direct an adjustable quantity of the hot gases into said inlet by-pass flue, a heat exchanger into which said by-pass flue opens and including a casing, a radiator core in said casing on the exterior surface of which the hot gases are adapted to impinge, a first duct connected with said casing to lead off the gases after having passed over the surfaces of said core, a blower operatively connected with said duct to propel the gases therethrough, a wet gas washing unit arranged to be fed the gases from said blower and adapted to wash and cool the gases, a second duct extending from said blower to said wet gas washing unit, a damper in the first duct upstream of said gas washing unit, means responsive to the suction in said flue to actuate the last-mentioned damper for maintaining the flow through said gas washing unit approximately the same velocity as that in said flue, a conduit leading from said washing unit to said core for conducting the cool gases thereto in order to extract heat from said core, said gas washing unit having a heat exchanger with air passages through which atmospheric cooling air is adapted to be passed, means for propelling the atmospheric cooling air through said air passages, thermostatically responsive means to control the quantity of air flow through the last mentioned means in order to regulate the temperature at which the gases are discharged from said gas washing unit, and means for leading gases from said core of the first-mentioned heat exchanger to be directed into the stack.

3. The combination of claim 1 wherein said wet gas washing unit includes a casing in which there is a chamber containing a liquid, a jacket arranged for the conduction of atmospheric cooling air in heat exchange but in isolated relationship with the liquid, and means to control the flow of atmospheric cooling air therethrough.

4. The combination of claim 1 wherein said wet gas washing unit includes a casing in which there is a chamber containing a liquid, a jacket arranged for the conduction of atmospheric cooling air in heat exchange but in isolated relationship with the liquid, a sediment chamber in said casing, and mechanical means in said sediment chamber to withdraw the sediment therefrom.

References Cited in the file of this patent
UNITED STATES PATENTS

| | | |
|---|---|---|
| 736,294 | Ogle | Aug. 11, 1903 |
| 833,467 | Lamond | Oct. 16, 1906 |
| 970,654 | Sepulchre | Sept. 20, 1910 |
| 1,218,354 | Baldwin | Mar. 6, 1917 |
| 1,269,724 | Martin | June 18, 1918 |
| 1,632,572 | Willcox | June 14, 1927 |
| 2,503,523 | Stuart | Apr. 11, 1950 |
| 2,586,692 | Morel | Feb. 19, 1952 |
| 2,608,388 | Miller | Aug. 26, 1952 |
| 2,653,799 | Stahn et al. | Sept. 29, 1953 |
| 2,703,228 | Fleisher | Mar. 1, 1955 |
| 2,705,595 | Carlson et al. | Apr. 5, 1955 |